(12) United States Patent
Kitamura

(10) Patent No.: US 9,063,024 B2
(45) Date of Patent: Jun. 23, 2015

(54) BICYCLE REAR HUB

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 376 days.

(21) Appl. No.: 13/587,861

(22) Filed: Aug. 16, 2012

(65) Prior Publication Data

US 2013/0049444 A1    Feb. 28, 2013

(30) Foreign Application Priority Data

Aug. 29, 2011   (JP) ................................ 2011-186589

(51) Int. Cl.
   *B60B 27/02*   (2006.01)
   *G01L 3/10*    (2006.01)
   *B62M 9/10*    (2006.01)
   *B60B 27/00*   (2006.01)

(52) U.S. Cl.
   CPC ............ *G01L 3/105* (2013.01); *B60B 27/0068* (2013.01); *B60B 27/023* (2013.01); *B62M 9/10* (2013.01); *B62K 2207/00* (2013.01); *G01L 3/102* (2013.01)

(58) Field of Classification Search
   CPC .... B60B 27/04; B60B 27/0068; B60B 27/02; B60B 27/023; F16D 41/24–41/36
   USPC ..................... 301/110.5; 73/514, 39, 862.29, 73/862.331–862.336, 862.193, 862.69; 192/64, 30 W
   See application file for complete search history.

(56) References Cited

U.S. PATENT DOCUMENTS

| | | | |
|---|---|---|---|
| 496,638 A | 5/1893 | Clark | |
| 3,599,482 A * | 8/1971 | Rundell | ................... 73/862.326 |
| 4,966,380 A * | 10/1990 | Mercat | ......................... 280/259 |
| 5,031,455 A | 7/1991 | Cline | |
| 5,065,633 A * | 11/1991 | Mercat | ..................... 73/862.326 |
| 6,418,797 B1 | 7/2002 | Ambrosina et al. | |
| 6,924,569 B2 | 8/2005 | Endo et al. | |
| 7,042,123 B2 | 5/2006 | Kitamura et al. | |
| 7,199,500 B2 * | 4/2007 | Yoshida | ........................ 310/257 |
| 8,091,674 B1 * | 1/2012 | Zhang et al. | ................... 180/220 |
| 8,278,789 B2 * | 10/2012 | Nakano | ........................ 310/67 A |
| 8,336,400 B2 * | 12/2012 | Lassanske | .................. 73/862.29 |
| 8,677,837 B2 * | 3/2014 | Mercat et al. | ............ 73/862.338 |
| 2011/0174110 A1 * | 7/2011 | Benkert et al. | ............... 74/594.2 |

FOREIGN PATENT DOCUMENTS

| | | | |
|---|---|---|---|
| DE | 4431029 A1 * | 3/1996 | |
| DE | 10 2007 046 749 A1 | 11/2008 | |
| EP | 1 186 446 A2 | 9/2001 | |
| EP | 1545076 A2 * | 6/2005 | |
| TW | 200841001 A | 10/2008 | |

* cited by examiner

*Primary Examiner* — S. Joseph Morano
*Assistant Examiner* — Jean Charleston
(74) *Attorney, Agent, or Firm* — Global IP Counselors

(57) ABSTRACT

A bicycle rear hub includes a hub spindle, a drive part, a hub shell and a driving force measuring part. The drive part is rotatably supported on the hub spindle, and configured to receive a driving-force-input member. The hub shell is rotatably supported on the hub spindle and operatively coupled to the drive part for rotation by the drive part on the hub spindle. The driving force measuring part includes a magnetostrictive element disposed in a driving force transmission path between the drive part and the hub shell, and a detection coil disposed in opposition to the magnetostrictive element.

11 Claims, 5 Drawing Sheets

BICYCLE REAR HUB

CROSS-REFERENCE TO RELATED APPLICATIONS

This application claims priority under 35 U.S.C. §119 to Japanese Patent Application No. 2011-186589, filed Aug. 29, 2011. The entire disclosure of Japanese Patent Application No. 2011-186589 is hereby incorporated herein by reference.

BACKGROUND

1. Field of the Invention

This invention generally relates to a bicycle hub. More specifically, the present invention relates to a rear bicycle hub constituting the hub for a rear wheel of a bicycle.

2. Background Information

A rear hub for a bicycle is provided with a hub spindle disposed at the center of rotation of the rear wheel; a hub shell installed rotatably about the hub spindle; and a freewheel disposed adjacently to the hub shell in the axial direction. Rotation of a sprocket, which is engaged with a chain, is delivered to the hub shell by the freewheel. There is known in the prior art a rear hub for a bicycle in which a driving force measuring part capable of measuring driving force of a rider is disposed between the freewheel and the hub shell (see U.S. Pat. No. 6,418,797, for example).

The prior art rear hub for a bicycle has a coupling member for coupling the freewheel and the hub shell. The coupling member is formed to a hollow cylindrical shape, and the sprocket is installed on one end part thereof, while the other end part is coupled to the hub shell. The coupling member is provided with a strain gauge for detecting twisting of a coupling part thereof, and detects the amount of twist of the coupling part. Driving force of a rider is measured from the amount of twist measured thereby.

SUMMARY

In the rear hub of the prior art, the strain gauge is affixed directly to the coupling part, and because it is necessary, for example, for the adhesive used for adhesion purposes to be made uniform, accuracy of assembly is difficult.

It is an object of the present invention to afford a rear hub for a bicycle, capable of measuring driving force in a manner relatively unaffected by accuracy of assembly.

In accordance with a first aspect of the invention, a bicycle rear hub is provided that basically comprises a hub spindle, a drive part, a hub shell and a driving force measuring part. The drive part is rotatably supported on the hub spindle, and configured to receive a driving-force-input member. The hub shell is rotatably supported on the hub spindle and operatively coupled to the drive part for rotation by the drive part on the hub spindle. The driving force measuring part includes a magnetostrictive element disposed in a driving force transmission path between the drive part and the hub shell, and a detection coil disposed in opposition to the magnetostrictive element.

In the rear hub for a bicycle described above, when rotation of the drive part is delivered to the hub shell, the magnetic permeability of the magnetostrictive element disposed to the driving force transmission path changes in a manner reflective of torque that is generated on the driving force transmission path, in response to the driving force. The inductance of the detection coil changes due to change in the magnetic permeability of the magnetostrictive element. The driving force can be measured by detecting the change in inductance of the magnetostrictive element, as an electrical signal. Herein, detection of change of driving force by the magnetostrictive element and the detection coil can take place in a non-contact manner, and is therefore relatively unaffected by accuracy of assembly.

The bicycle rear hub according to a second aspect of the invention is the bicycle rear hub as recited in the first aspect, wherein the detection coil is installed on the hub spindle, at a location opposable relative to the magnetostrictive element. In this case, because the detection coil is installed on the non-rotating hub spindle, the output of the detection coil can readily be routed to the exterior of the hub shell.

The bicycle rear hub according to a third aspect of the invention is the bicycle rear hub as recited in the second aspect, further comprising an attachment member installed non-rotatably on the hub spindle, and in a manner opposable relative to the magnetostrictive element. The detection coil is installed on the attachment member. In this case, because the detection coil can be disposed on the attachment member which is secured to the hub spindle, rather than disposed directly on the hub spindle, there is increased freedom of disposition of the detection coil.

The bicycle rear hub according to a fourth aspect of the invention is the bicycle rear hub as recited in the first aspect, wherein the detection coil is installed on the hub shell, at a location opposable relative to the magnetostrictive element. In this case, the detection coil can be readily disposed to the outside from the magnetostrictive element, in the diametrical direction of the hub spindle.

The bicycle rear hub according to a fifth aspect of the invention is the bicycle rear hub as recited in any of the first to fourth aspects, wherein the detection coil is disposed between the hub spindle and the magnetostrictive element. In this case, the detection coil can be direct-installed on the hub spindle. Therefore, the structure for installing the detection coil can be simplified.

The bicycle rear hub according to a sixth aspect of the invention is the bicycle rear hub as recited in any of the first to fourth aspects, wherein the detection coil is disposed between the magnetostrictive element and the hub shell.

The bicycle rear hub according to a seventh aspect of the invention is the bicycle rear hub as recited in any of the first to sixth aspects, further provided with a sleeve disposed to the driving force transmission path, wherein the magnetostrictive element is retained by the sleeve. In this case, for example, the magnetostrictive element can be formed in a manner not contingent upon a level of rigidity necessitated by transmission of driving force, whereby a material having optimal magnetic permeability for detection purposes can be employed.

The bicycle rear hub according to an eighth aspect of the invention is the bicycle rear hub as recited in the seventh aspect, wherein the drive part and the sleeve are integrally formed. In this case, because the drive part and the sleeve are integrally formed, the structure is simpler.

The bicycle rear hub according to a ninth aspect of the invention is the bicycle rear hub as recited in any of the first to eighth aspects, further provided with a wireless transmitter whereby information based on the output of the detection coil is transmitted wirelessly to the outside. For example, even if the detection coil rotates in tandem with the hub shell, the output thereof can readily be routed to the exterior.

The bicycle rear hub according to a tenth aspect of the invention is the bicycle rear hub as recited in any of the first to ninth aspects, further provided with a power supply for supplying power to the detection coil. In this case, because a power supply is disposed, there is no need to furnish a power supply separate from the rear hub.

The bicycle rear hub according to an eleventh aspect of the invention is the bicycle rear hub as recited in the tenth aspect, wherein the power supply is a battery. In this case, the structure of the power supply is simpler.

The bicycle rear hub according to a twelfth aspect of the invention is the bicycle rear hub as recited in the tenth aspect, wherein the power supply is a generator. In this case, power is generated during travel of the bicycle, and therefore the need for external charging, or to replace a battery, is obviated.

With the bicycle rear hub of this present disclosure, detection of driving force by the magnetostrictive element and the detection coil takes place in non-contact fashion, and is therefore relatively unaffected by accuracy of assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
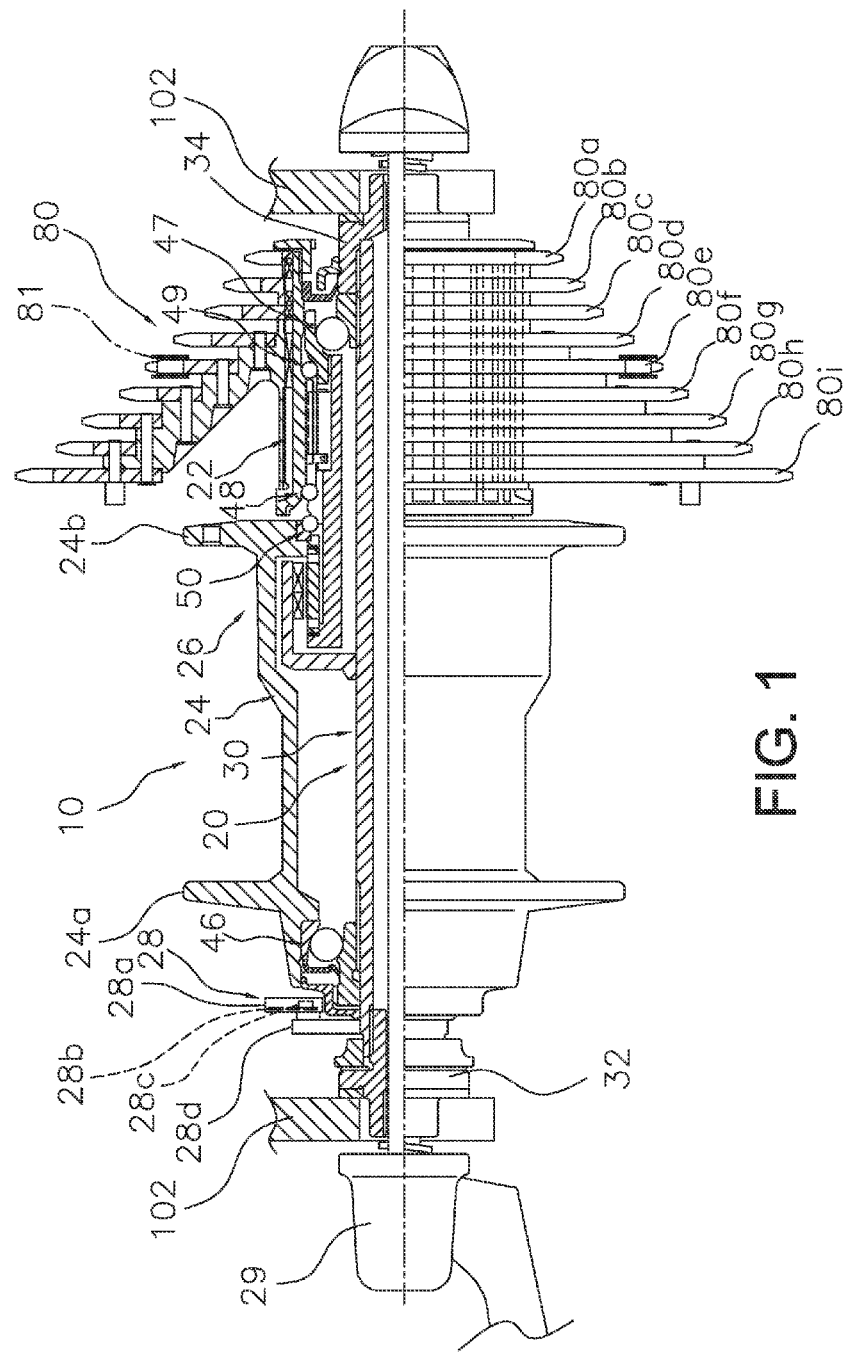
FIG. 1 is a half cross sectional view of a bicycle rear hub in accordance with a first embodiment, on which a sprocket has been installed.

Referring initially to FIG. 1, a bicycle rear hub 10 is illustrated in accordance with a first embodiment. As shown in FIG. 1, the rear hub 10 is installable on a hub spindle mounting section 102 that is disposed on the rear part of the frame of a bicycle. The rear hub 10 is provided with a hub spindle 20; a drive part 22; a hub shell 24; a driving force measuring part 26 and a wireless transmitter 28. The hub shell 24 is rotatably supported on the hub spindle 20 by a first bearing 46. The drive part 22 is rotatably supported on the hub spindle 20 by a second bearing 47. The driving force measuring part 26 is capable of measuring the driving force of a rider. The wireless transmitter 28 wirelessly transmits information relating to measured driving force. The wirelessly transmitted information relating to driving force is displayed, for example, on a cycle computer (not shown) that is installable on the handlebar of the bicycle. Information such as speed of the bicycle, rotation speed of the crank (cadence), travel distance, and the like, is displayed on the cycle computer as well.

Figure 2:
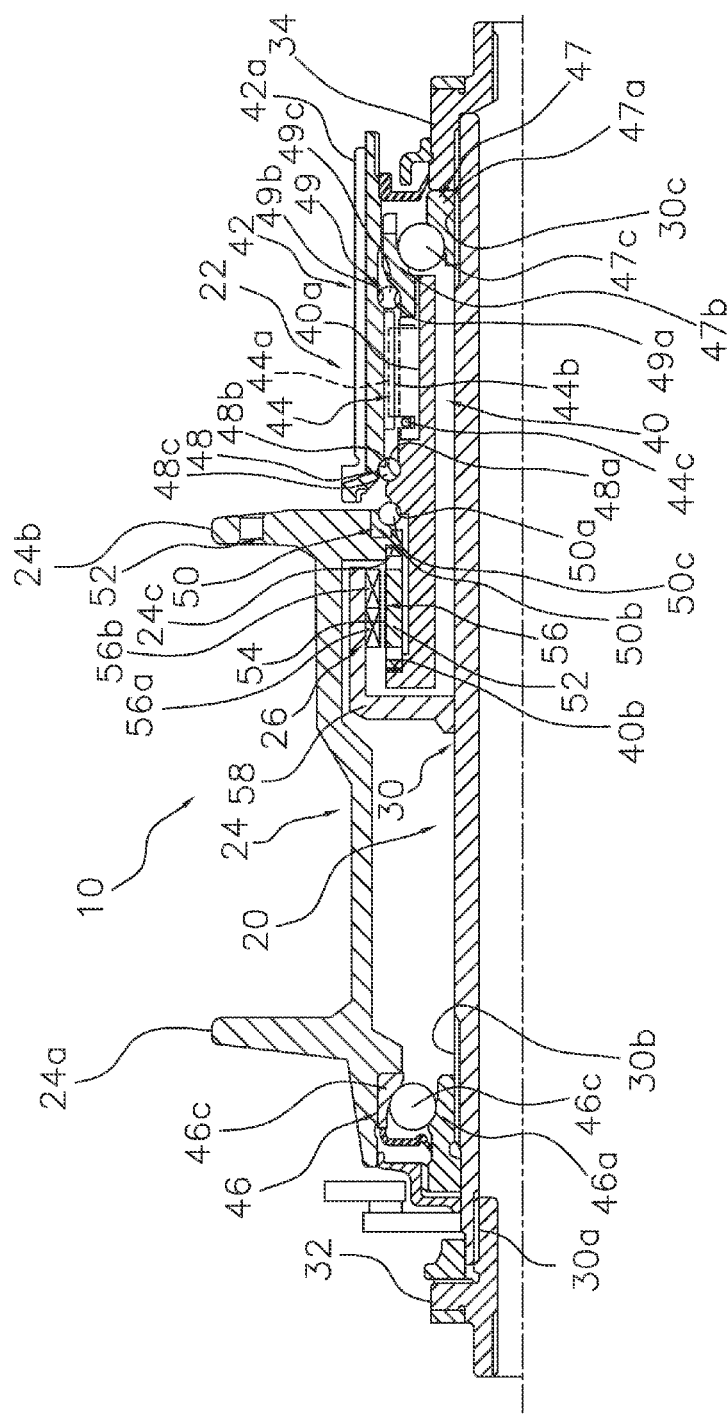
FIG. 2 is a fragmentary cross sectional view of the bicycle rear hub in FIG. 1.

The hub spindle 20 has a hollow spindle body 30 with a quick release mechanism 29 installed thereon; a first lock nut 32 installed at a first end of the spindle body 30 (the end at the left side in FIG. 2); and a second lock nut 34 installed at a second end of the spindle body 30 (the end at the right side in FIG. 2). The hub spindle mounting section 102 is designed to install onto the first lock nut 32 and the second lock nut 34. Herein, a configuration whereby the first lock nut 32 and the second lock nut 34 install within the hub spindle mounting section 102 is disclosed, but a configuration whereby the spindle body 30 installs within the hub spindle mounting section 102 on the frame would be acceptable as well.

As shown in FIG. 2, a female thread part 30a is formed on the inner peripheral surface of the first end of the spindle body 30. A first male thread part 30b and a second male thread part 30c are formed respectively on the outside peripheral surfaces of the first and second ends of the spindle body 30. The first lock nut 32 has a male thread part that threadably mates with the female thread part 30a, and is fastened by threading onto the spindle body 30. The second lock nut 34 has a female thread part that threadably mates with the second male thread part 30c, and is fastened by threading onto the spindle body 30.

The configuration of the drive part 22 includes a member known as a freewheel. The drive part 22 has a first member 40 rotatably supported on the hub spindle 20; a second member 42 disposed to the outside peripheral side from the first member 40; a one-way clutch 44 disposed between the first member 40 and the second member 42; and a sleeve 52.

The first member 40 is a member of tubular shape rotatably supported on the hub spindle 20 by the second bearing 47. The second bearing 47 has a second inner race element 47a, a second outer race element 47b, and a plurality of second rolling elements 47c. The second inner race element 47a has a thread formed on the outside peripheral part thereof, and is fastened by threading to the second male thread part 30c of the spindle body 30. The second outer race element 47b has a thread formed on the inside peripheral part thereof, and is fastened by threading to a male thread part formed on the outside peripheral face of the first member 40. The second rolling elements 47c are spaced apart in the circumferential direction and disposed between the second inner race element 47a and the second outer race element 47b. The second rolling elements 47c are rotatably retained by a retainer, not shown, and are disposed at predetermined spacing in the circumferential direction. The second rolling elements 47c may be spherical elements, or rollers.

The first member 40 has in the outside peripheral part thereof a recess 40a for housing a clutch pawl 44a of the one-way clutch 44. A first end of the first member 40 (the end on the left side in FIG. 2) extends as far as the inside peripheral side of the hub shell 24. On the outside peripheral face of the first member 40 are formed a third cone face 48a of a third bearing 48 rotatably supporting the second member 42, and a fifth cone face 50a of a fifth bearing 50 that rotatably supports the hub shell 24. On the outside peripheral part of the first end of the first member 40 is formed a first coupling part 40b to which a first end of the sleeve 52 (the end at the left side in FIG. 2) is coupled. The sleeve 52 rotates in unison with the first member 40.

The second member 42 is a member of tubular shape supported rotatably with respect to the first member 40, by the third bearing 48 and a fourth bearing 49. The third bearing 48 is formed by the third cone face 48a mentioned previously, a third cup face 48b, and a plurality of third rolling elements 48c. The third cup face 48b is formed on the inside peripheral face of a first end of the second member 42 (the end at the left side in FIG. 2). The third rolling elements 48c are spaced apart in the circumferential direction and disposed between the third cone face 48a and the third cup face 48b. The third rolling elements 48c are rotatably retained by a retainer, not shown, and are disposed at predetermined spacing in the circumferential direction. The third rolling elements 48c may be spherical elements, or rollers.

The fourth bearing 49 is formed by a fourth cone face 49a formed on the outside peripheral face of the second outer race element 47b, a fourth cup face 49b, and a plurality of fourth rolling elements 49c. The fourth cup face 49b is formed on the inside peripheral face of the second member 42, in the medial part thereof in the direction of the hub spindle. The fourth rolling elements 49c are spaced apart in the circumferential direction and disposed between the fourth cone face 49a and the fourth cup face 49b. The fourth rolling elements 49c are rotatably retained by a retainer, not shown, and are disposed at predetermined spacing in the circumferential direction. The fourth rolling elements 49c may be spherical elements, or rollers.

As shown in FIG. 1, the second member 42 has on the outside peripheral face thereof a sprocket installation part 42a adapted for installation of a sprocket assembly 80. The sprocket assembly 80 rotates in unison with the second member 42. The sprocket assembly 80 is one example of the driving-force-input member. The sprocket installation part 42a has, for example, splines which are disposed on the outside peripheral face thereof, and which have projecting parts or recessed parts spaced apart in the circumferential direction. The sprocket assembly 80 has several (e.g., nine) sprockets 80a to 80i with different numbers of teeth. Rotation of the crank, not shown, is delivered to the drive part 22 by meshing of a chain 81 with any sprocket of the sprocket assembly 80. Herein, several sprockets are installed on the sprocket installation part 42a, but the number of sprockets installed on the sprocket installation part 42a may be singular.

As shown in FIG. 2, the one-way clutch 44 is disposed for the purpose of delivering to the first member 40 only rotation of the second member 42 in the direction of advance of the bicycle. In so doing, only rotation of the crank in the direction of advance is delivered to the hub shell 24. Rotation of the hub shell 24 in the direction of advance is not delivered to the second member 42. The one-way clutch has a clutch pawl 44a disposed rockably between a first attitude and a second attitude in the recess 40a, ratchet teeth 44b formed on the inside peripheral face of the second member 42, and an urging member 44c for urging the clutch pawl 44a. The clutch pawl 44a contacts the ratchet teeth 44b when in the first attitude, and disengages from the ratchet teeth 44b when in the second attitude. The urging member 44c is installed in an annular groove formed in the first member 40. The urging member 44c is a spring member formed by bending a metal wire material to a "C" shape, and urges the clutch pawl 44a towards the first attitude.

Figure 3:
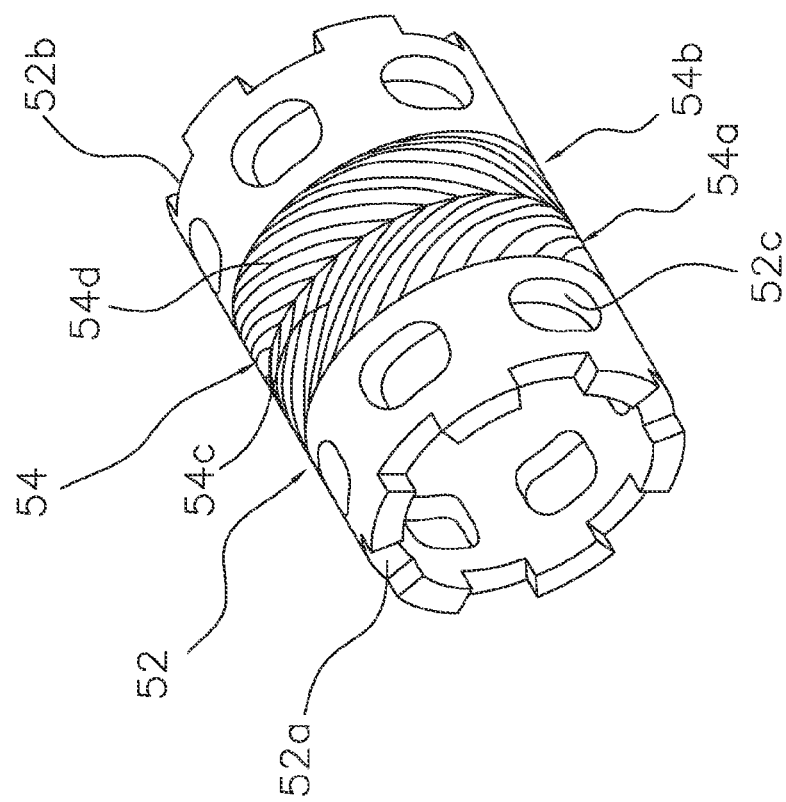
FIG. 3 is a perspective view of a sleeve.

The sleeve 52 is disposed on the driving force transmission path from the drive part 22 to the hub shell 24. The sleeve 52 is coupled at a first end thereof (the end at the left side in FIG. 2) to the first member 40 of the drive part 22. The sleeve 52 and the first member 40 rotate in unison. In the present embodiment, the sleeve 52 is disposed between the first end of the first member 40 of the drive part 22, and the inside peripheral face of the second end of the hub shell 24 (the end at the right side in FIG. 1). As shown in FIG. 3, the sleeve 52 is a member of tubular shape, and has at a first end thereof (the end at the left side in FIG. 3) a first engaging part 52a for engaging the first coupling part 40b. The first engaging part 52a has a recess that is recessed in the hub spindle direction and/or a protrusion that protrudes in the hub spindle direction. In the present embodiment, the first engaging part 52a is formed with a recessed/protruding profile in the hub spindle direction. The sleeve 52 has at a second end thereof (the end at the right side in FIG. 3) a second engaging part 52b for engaging a second coupling part 24c. The second engaging part 52b has a recess that is recessed in the hub spindle direction and/or a protrusion that protrudes in the hub spindle direction; in the present embodiment, the second engaging part 52b is formed with a recessed/protruding profile in the hub spindle direction. By connecting the sleeve 52 to the second end of the hub shell 24 in proximity to the sprocket assembly 80, the first member 40 is kept to the minimum possible size in the hub spindle direction, and the increase in weight can be minimized. Herein, the first and second engaging parts 52a and 52b are formed with recessed/protruding profiles in the hub spindle directions, but a shape having recesses or protrusions protruding in a radial direction are also acceptable, as are serrations.

Several holes 52c are formed spaced apart in the circumferential direction in the sleeve 52. The holes 52c are oval in shape and elongated in the circumferential direction, and perforate the sleeve 52. In the present embodiment, the holes 52c are respectively disposed at the first and second ends of the sleeve 52, to either side of the medial part. These holes 52c are disposed for the purpose of facilitating twisting of the sleeve 52 in response to driving force, when driving force (torque) is delivered from the drive part 22 to the hub shell 24.

As shown in FIG. 2, the hub shell 24 at a first end thereof (the end at the left side in FIG. 2) is supported rotatably about the spindle body 30 of the hub spindle 20, by the first bearing 46. As mentioned previously, the second end of the hub shell 24 (the end at the right side in FIG. 2) is supported rotatably about the spindle body 30 of the hub spindle 20, via the drive part 22, by the fifth bearing 50. The first bearing 46 has a thread formed on an inside peripheral face thereof, and has a first inner race element 46a threadedly fastened onto the first male thread part 30b of the spindle body 30; a first outer race element 46b; and a plurality of first rolling elements 46c. The first rolling elements 46c are rotatably retained by a retainer (not shown), and are disposed at predetermined spacing in the circumferential direction. The first rolling elements 46c may be spherical elements, or rollers.

The fifth bearing 50 has the fifth cone face 50a mentioned previously; a fifth outer race element 50b that is, for example, fastened by being press-fitted within the inside peripheral part of the second end of the hub shell 24; and a plurality of fifth rolling elements 50c. The fifth rolling elements 50c are disposed spaced apart in the circumferential direction, between the fifth cone face 50a and the fifth outer race element 50b. The fifth rolling elements 50c are rotatably retained by a retainer, not shown, and are disposed at predetermined spacing in the circumferential direction. The fifth rolling elements 50c may be spherical elements, or rollers.

As shown in FIG. 1, a first hub flange 24a and a second hub flange 24b adapted to couple with the spokes of the rear wheel of the bicycle are formed spaced apart in the axial direction of the hub spindle 20, and protrude in an annular shape from the outside peripheral part of the hub shell 24. A second coupling part 24c adapted to couple with the second end of the sleeve 52 is formed adjacent to the fifth bearing 50, on the inside peripheral part of the second end of the hub shell 24 (the end at the right side in FIG. 2).

The driving force measuring part 26 has a magnetostrictive element 54 and a detection coil 56.

The magnetostrictive element 54 is disposed by fastening to the medial part of the outside peripheral face of the sleeve 52. The magnetostrictive element 54 is fastened to the sleeve by adhesive bonding, for example. The magnetostrictive element 54 and the detection coil 56 are sensors utilized for the inverse magnetostriction effect of a magnetic material. When torque acts on the sleeve 52, the magnetostrictive element 54 experiences a change in magnetic permeability in response to a change of principal stress at the surface of the sleeve 52. The magnetostrictive element 54 has a first magnetostrictive material 54a of belt shape having a first axis of easy magnetization 54c; and a second magnetostrictive material 54b having a second axis of easy magnetization 54d intersecting the first axis of easy magnetization 54c. In this embodiment, the first axis of easy magnetization 54c and the second axis of easy magnetization 54d are orthogonal.

As shown in FIG. 2, the detection coil 56 is fastened to an attachment member 58 which is non-rotatably coupled to the spindle body 30 of the hub spindle 20. The inside peripheral face of the attachment member 58 is disposed in opposition to the outside peripheral face of the magnetostrictive element 54. The attachment member 58 has a first section fastened to the spindle body 30 and extending towards the outside periphery from the spindle body 30, and a second section extending in the direction of the hub spindle from an end of the first section. Herein, the first section and the second section are formed to annular or tubular shape. The detection coil 56 is disposed on the second section. The detection coil 56 has a first coil 56a disposed in opposition to the first magnetostrictive material 54a, and a second coil 56b disposed in opposition to the second magnetostrictive material 54b. In the present embodiment, the detection coil 56 is disposed between the magnetostrictive element 54 and the hub shell 24.

The driving force measuring part 26 measures a driving force by detecting, as an electrical signal, a change in inductance of the detection coil 56 arising due to a change in the magnetic permeability of the magnetostrictive element 54. The driving force includes torque.

As shown in FIG. 1, the wireless transmitter 28 is disposed, for example, to the outside from the first end of the hub shell 24 in the direction of the hub spindle. The wireless transmitter 28 has a case 28a fastened to the outside peripheral part of the hub spindle 20. The case 28a has a fastening part 28d for fastening to the hub spindle 20. The spindle body 30 is passed through the fastening part 28d. By tightening the first lock nut 32, the fastening part 28d is fastened by being clamped directly or indirectly between the first lock unit 32 and the first outer race element 46a. A circuit board 28b is disposed within the case 28a. The detection coil 56 and the circuit board 28b are electrically connected by wiring, not shown. On the circuit board 28b are mounted electronic components such as a microcomputer, an amplifier for amplifying the output of the detection coil 56, an analog-digital (AD) conversion circuit for converting the signal amplified by the amplifier to a digital signal, a wireless transmission circuit, and the like; as well as a rechargeable battery 28c as the power supply. In the present embodiment, the microcomputer, the amplifier, and the AD conversion circuit constitute part of the driving force measuring part 26.

The wireless transmitter 28 wirelessly transmits information based on the output of the detection coil 56. The information wirelessly transmitted from the wireless transmitter 28 is displayed by a cycle computer, not shown, as driving force, torque, and/or power. Based on the output of the detection coil 56, the driving force, torque, and/or power may be calculated in the microcomputer disposed on the circuit board 28b; or the driving force, torque, and/or power may be calculated in the cycle computer, based on the received information. A primary battery may be disposed in place of the rechargeable battery 28c. The rechargeable battery 28c or the primary battery is detachably disposed on the case 28a. The case 28a may be disposed, for example, with terminals employed when charging the rechargeable battery 28c.

In the rear hub 10 configured in this manner, when the rider pedals the pedals attached to the bicycle, the rider's tread force is delivered as driving force from the drive part 22 to the hub shell 24. At this time, the principal stress of the sleeve 52 of the drive part 22 changes, the magnetic permeability of the magnetostrictive element 54 changes, and the inductance of the detection coil 56 changes. An electrical signal representing this change is processed by the circuit board 28b, and is transmitted wirelessly to the cycle computer by the wireless transmitter 28. In the cycle computer, the wirelessly transmitted information representing the driving force is received and displayed. The rider can thereby be apprised of the self-generated driving force, torque, power, and the like.

Herein, because the magnetostrictive element 54 and the detection coil 56 can detect the driving force in a non-contact manner, they can be relatively unaffected by accuracy of assembly.

Figure 4:
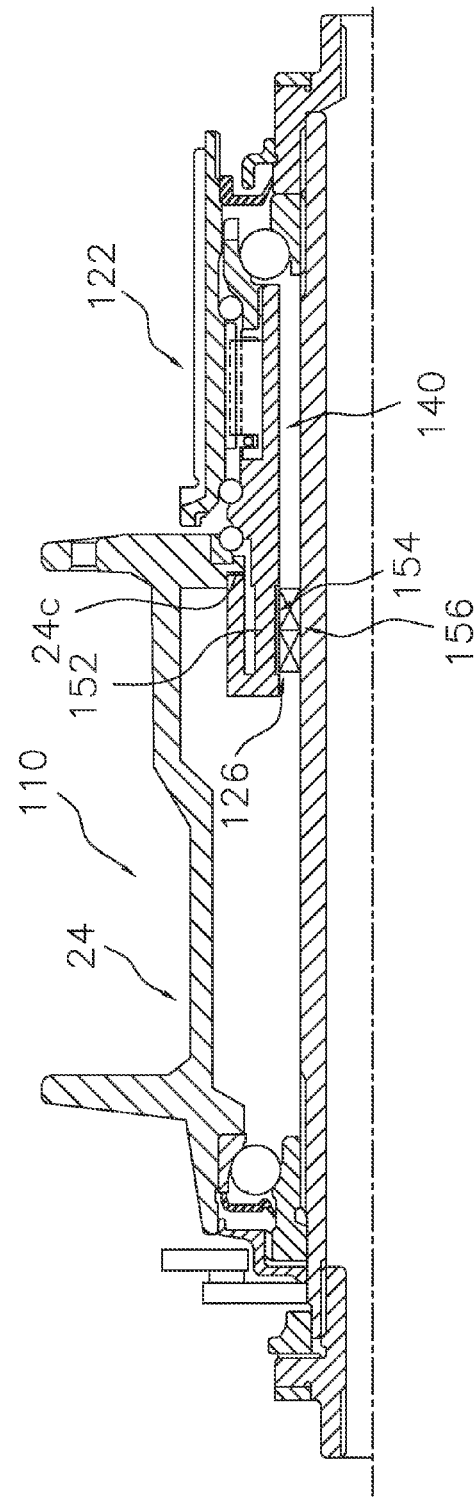
FIG. 4 is a fragmentary cross sectional view, corresponding to FIG. 2, of a bicycle rear hub in accordance with a second embodiment.

In the preceding embodiment, the detection coil 56 is installed in the attachment member 58 which is fastened to the hub spindle 20, and the magnetostrictive element 54 is disposed between the detection coil 56 and the spindle body 30 of the hub spindle 20. In a second embodiment, as shown in FIG. 4, a detection coil 156 is disposed directly on the outside peripheral face of the spindle body 30 of the hub spindle 20. In the following description, descriptions of members of configuration and shape comparable to those of the first embodiment are omitted.

As shown in FIG. 4, in a rear hub 110, a sleeve 152 of a drive part 122 is a rod-shaped section integrally formed with a first member 140 of the drive part 122. A magnetostrictive element 154 of a driving force measuring part 126 is retained at the inside peripheral part of the sleeve 152. The sleeve 152 is integrally formed with the first member 140 inside the hub shell 24. A first end of the first member 140 (the end at the left side in FIG. 4) is bent towards the second end of the hub shell 24 (the end at the right side in FIG. 4). The distal end of this first member 140 is coupled rotatably in unison with the second coupling part 24c of the hub shell 24. Here, the sleeve 152 has been formed by a plurality of rod-shaped sections spaced apart in the circumferential direction about the hub spindle, but may instead be formed to a hollow cylindrical shape in similar fashion to the preceding embodiment, or disposed separately from the first member 140.

As mentioned previously, the detection coil 156 is fastened directly to the outside peripheral face of the spindle body 30 of the hub spindle 20. Consequently, in this second embodiment, the detection coil 156 is disposed between the magnetostrictive element 154 and the hub spindle 20.

In the rear hub 110 configured in this manner according to the second embodiment, because the magnetostrictive element 154 and the detection coil 156 can detect the driving force in a non-contact manner in the same manner as in the first embodiment, they can be relatively unaffected by accuracy of assembly.

Figure 5:
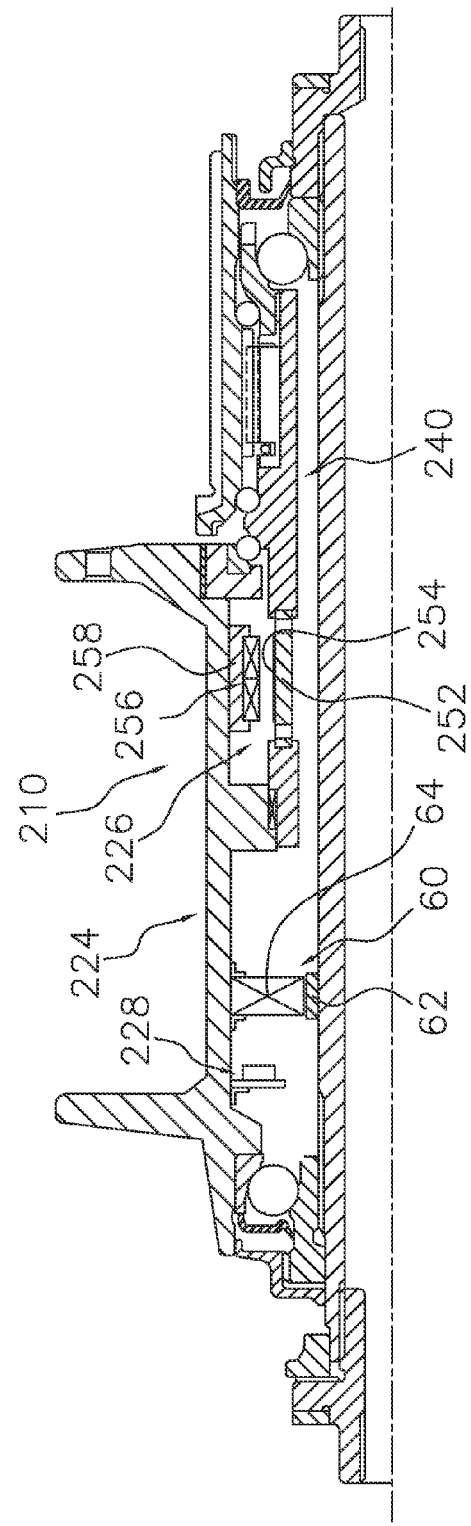
FIG. 5 is a fragmentary cross sectional view, corresponding to FIG. 2, of a bicycle rear hub in accordance with a third embodiment.

In the first and second embodiments, the detection coil is non-rotatably installed on the hub spindle 20; in a third embodiment, however, a detection coil 256 of a driving force measuring part 226 of a rear hub 210 is installed on a hub shell 224, as shown in FIG. 5. The detection coil 256 and the hub shell 224 rotate in unison. A coil attachment member 258 of annular shape for the purpose of installing the detection coil 256 is disposed at the inside peripheral part of the hub shell 224. The sleeve 252 is disposed midway along a first member 240 of a drive part 224. The first member 240 is coupled by serrations to the center of the hub shell 224 in the hub spindle direction. The general configuration of the sleeve 252 is one comparable to that of the sleeve 52 of the first embodiment; however, the two ends of the sleeve 252 are fastened to the first member 240. A magnetostrictive element 254 is retained on the outside peripheral face of this sleeve 252. In this third embodiment, the detection coil 256 is disposed between the magnetostrictive element 254 and the hub shell 224, in the same manner as in the second embodiment.

In the third embodiment, because the detection coil 256 rotates, a wireless transmitter 228 is fastened to the hub shell 224. Here, the wireless transmitter 228 is fastened to the inside peripheral part of the hub shell 224. Even in a case in which the wireless transmitter 228 is fastened to the inside peripheral part of the hub shell 224, it is preferable for the antenna to be disposed to the outside of the hub shell 224.

Additionally, this rear hub 210 is disposed with a generator 60 as the power supply for the magnetostrictive element 254 and the wireless transmitter 228. The generator 60 has a magnet 62 fastened to the outside peripheral face of the spindle body 30 of the hub spindle 20; and a rotor 64 disposed in opposition to the magnet 62, to the outside peripheral side of the magnet 62. The rotor 64 has a coil bobbin fastened to the inside peripheral face of the hub shell 224; a magneto coil wound onto the coil bobbin; and a yoke disposed about the perimeter of the magneto coil. The output of the magneto coil is rectified to direct current by a rectifier disposed on the wireless transmitter 228, and is used as a power supply.

According to the rear hub 210 of the third embodiment, because the magnetostrictive element 254 and the detection coil 256 can detect the driving force in a non-contact manner in the same manner as in the first and second embodiments, they can be relatively unaffected by accuracy of assembly. Moreover, the outside diameter of the hub shell 224 in its medial part in the hub spindle direction can be made smaller than in the first and second embodiments.

While the present invention has been described above in terms of certain preferred embodiments, the present invention is not limited to the previously explained embodiments, and various modifications are possible within the scope and spirit of the invention.

In the previously explained embodiments, the configuration of the drive part 22 included a so-called freewheel having a one-way clutch, but the present invention is not limited thereto. The present invention can be implemented, for example, in a rear hub devoid of a freewheel.

In the previously explained embodiments, a rear hub having a quick release mechanism 29 was shown by way of example; however, the present invention can be implemented in a rear hub lacking a quick release mechanism.

In the previously explained embodiments, a generator and a rechargeable battery were shown by way of examples of the power supply, but the present invention is not limited thereto. A rechargeable capacitor or other such storage element may be employed as well, for example. A non-rechargeable primary battery may be employed as the power supply as well.

In the previously explained third embodiment, the generator 60 was employed to supply electrical power to the detection coil 56 and the wireless transmitter 28, but the present invention is not limited thereto. Instead, the wireless transmitter may detect the electrical power waveform of the direct current output by the generator 60, and obtain a rotation speed signal for the rear hub. Information relating to the rotation speed signal obtained thereby, and torque representing the driving force measured by the driving force measuring part, may then be employed by the microcomputer to calculate the power. Additionally, by having the wireless transmitter transmit the information relating to the rotation speed signal to the cycle computer, which performs multiplication by the circumferential length of the rear wheel, the information can be employed for display of wheel speed by the cycle computer.

The configurations of each of the previously explained embodiments can be combined with one another. For example, the first or second embodiment may be disposed with a generator inside the hub shell, as taught in the third embodiment. In this case, a configuration in which the hub spindle is disposed with a magneto coil, and the hub shell or the first member is disposed with a magnet, can be adopted for the generator. Moreover, in the third embodiment, a primary battery or a secondary battery may be disposed in place of the generator. Additionally, for example, in the third embodiment, the detection coil may be disposed on the hub spindle. Also, for example, in the first embodiment, the detection coil may be disposed on the hub shell 24.

Whereas each of the previously explained embodiments had a configuration in which the magnetostrictive element is disposed on the sleeve, the magnetostrictive element may be integrally formed with the sleeve. In this case, the number of components can be reduced.

In the previously explained embodiments, holes perforating the sleeve were formed in the sleeve; however recesses may be formed in place of perforating holes, or a configuration not disposed with holes may be adopted.

In the previously explained embodiments, any one or several of the first to fifth bearings may be modified to sliding bearings. Weight can be reduced in this case.

In the previously explained embodiments, the section constituting the freewheel in the first member may be configured to be detachable from the other section. With this configuration, the freewheel can be replaced without constraint. The detachable section in the first member may be joined to the other section by a linking mechanism such as serrations.

Thus, the foregoing descriptions of the embodiments according to the present invention are provided for illustration only, and not for the purpose of limiting the invention as defined by the appended claims and their equivalents.

What is claimed is:

1. A bicycle rear hub comprising:
   a hub spindle;
   a drive part rotatably supported on the hub spindle and configured to receive a driving-force-input member, the drive art a a first member, a second member and a one-way clutch disposed between the first and second members;
   a hub shell rotatably supported on the hub spindle and operatively coupled to the drive part for rotation by the drive part on the hub spindle; and
   a driving force measuring part including a magnetostrictive element disposed in a driving force transmission path between the drive part and the hub shell, and a detection coil disposed in opposition to the magnetostrictive element,
   the drive part further having a sleeve disposed in the drive force transmission path and being rotatable with the first member of the drive part, the sleeve retaining the magnetostrictive element.

2. The bicycle rear hub as recited in claim 1, wherein the detection coil is disposed on the hub spindle at a location opposite to the magnetostrictive element.

3. The bicycle rear hub as recited in claim 2, further comprising
   an attachment member non-rotatably mounted on the hub spindle, and the detection coil being installed on the attachment member.

4. The bicycle rear hub as recited in claim 1, wherein the detection coil is disposed on the hub shell at a location opposite to the magnetostrictive element.

5. The bicycle rear hub as recited in claim 1, wherein the detection coil is disposed between the hub spindle and the magnetostrictive element.

6. The bicycle rear hub as recited in claim 1, wherein the detection coil is disposed between the magnetostrictive element and the hub shell.

7. The bicycle rear hub as recited in claim 1, wherein the sleeve is integrally formed with the drive part.

8. The bicycle rear hub as recited in claim 1, further comprising
a wireless transmitter whereby information based on the output of the detection coil is transmitted wirelessly to the outside.

9. The bicycle rear hub as recited in claim 1, further comprising
a power supply for supplying power to the detection coil.

10. The bicycle rear hub as recited in claim 9, wherein the power supply is a battery.

11. The bicycle rear hub as recited in claim 9, wherein the power supply is a generator.

* * * * *